United States Patent [19]

Sangster

[11] 4,159,403
[45] Jun. 26, 1979

[54] TELEPHONE SET ATTACHMENT FOR NOTE HOLDING

[76] Inventor: Arlon G. Sangster, P.O. Box 414, Sterling, Mass. 01564

[21] Appl. No.: 883,495

[22] Filed: Mar. 6, 1978

[51] Int. Cl.² ............................................. H04M 1/21
[52] U.S. Cl. ...................................... 179/178; 40/336
[58] Field of Search ............ 179/178, 146 R; 40/336, 40/10 R; 281/15 B

[56] References Cited

U.S. PATENT DOCUMENTS

| 286,332 | 10/1883 | Ruffani | 40/10 R |
| 2,626,479 | 1/1953 | Marrits | 281/15 B |
| 2,791,865 | 5/1957 | Iscoe | 281/15 B |
| 2,795,877 | 6/1957 | Falk | 40/336 |
| 2,911,485 | 11/1959 | Harris | 179/146 R |
| 3,587,188 | 6/1971 | Dietrich et al. | 40/336 |

Primary Examiner—Thomas W. Brown
Attorney, Agent, or Firm—Charles R. Fay

[57] ABSTRACT

A note holder detachably connected in the hand hold lift slot at the rear of a desk type telephone comprising a molded plastic substantially flat sheet of material having a head and arms, the arms terminating in portions to be removed for certain types of telephones, each arm having a pair of notches on its upper edge, the arms being foldable into parallelism for insertion into the hand hold slot and engagement with the lip at the top thereof.

6 Claims, 3 Drawing Figures

TELEPHONE SET ATTACHMENT FOR NOTE HOLDING

DISCUSSION OF THE PRIOR ART

There have been telephone pad attachments and message holders suggested in the prior art, examples being U.S. Pat. Nos. 2,791,856; 2,488,516; 2,626,479 and 3,245,696, among others. However, these devices are relatively expensive to manufacture because they are usually molded in three dimensions having upstanding side members e.g. for engagement with the hand hold lift slot or opening found in telephones of the desk type.

SUMMARY OF THE INVENTION

The distinction of the present invention over the prior art resides in the fact that in the present case the device is inexpensively molded flat and in one piece, with a central portion thereof in a nature of head including two springy members for the reception of a message or a small pad between the same, said head having two arms extending oppositely therefrom with hinge lines at the junctions of the head and the arms so that the arms may be easily manually folded inwardly into a generally parallel relation.

Each arm terminates in a small portion which may be left unchanged for most telephones but for certain telephones which use push buttons, called key telephones etc., these must be cut off for instance with a sharp knife or a pair of sissors, or they can be folded.

Each arm is provided with a pair of notches at its upper edge, these notches being alinged when the arms are folded for engagement with the lip found at the top edge of the entrance of the hand hold opening or lift slot found at the rear of the usual desk telephone. The arms have a width from the notches to the opposite edges thereof approximately equal to the height of the lift slot.

In order to firmly insert the device so as to be detachably connected with respect to said phone, it is only necessary to bend the arms, clip of the excess ends in certain cases as stated, and snap the arms into the hand hold lift slot with one or the other of the aligned pair of spaced notches snapping past the lip at the entrance of the lift slot.

PREFERRED EMBODIMENT OF THE INVENTION

Figure 1:
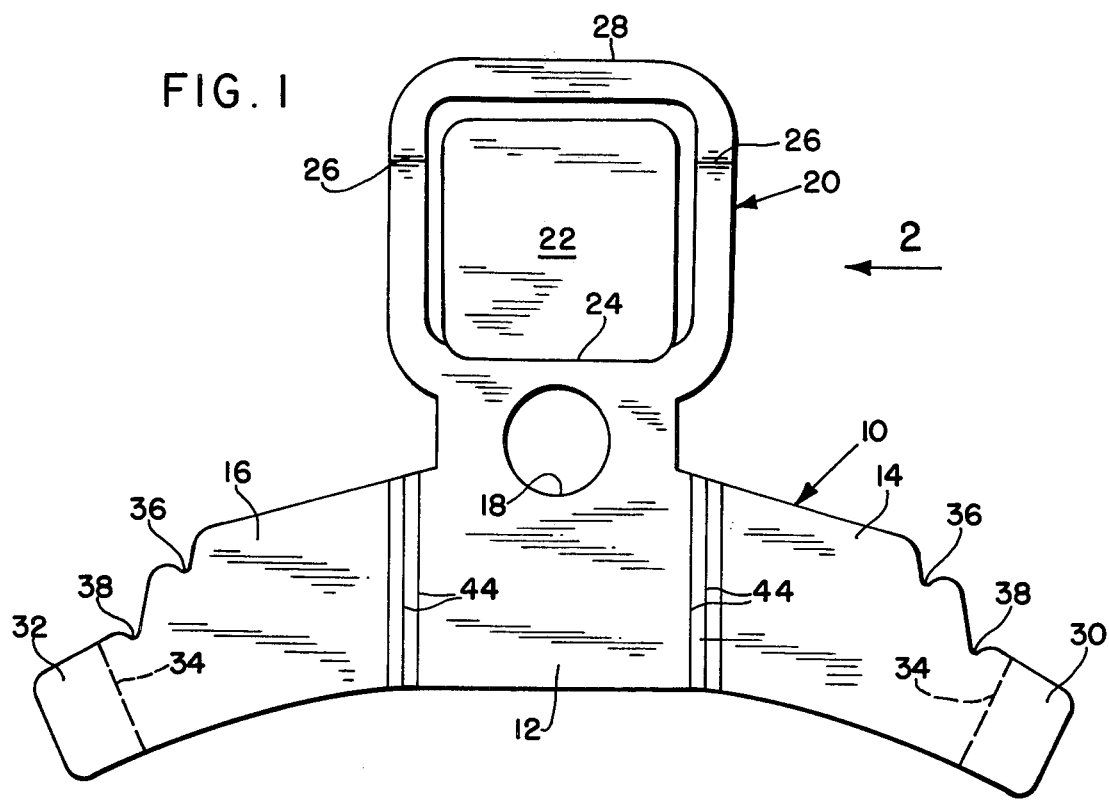
FIG. 1 is a plan view illustrating the device as molded.
Figure 2:
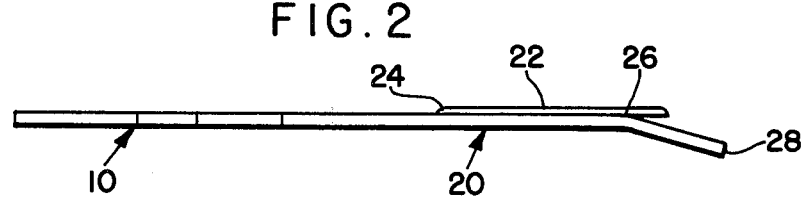
FIG. 2 is a view in side elevation thereof looking in the direction of arrow 2 in FIG. 1.

A generally flat sheet of plastic material is molded in form shown in FIGS. 1 and 2 with a main portion 10 comprising a head 12 and a pair of oppositely extending arms 14 and 16. The head is provided with an opening 18 if desired and extends into an open frame generally indicated at 20 which surrounds an extension of the head at 22.

The extension 22, see FIG. 2, is generally straight and flat although off set somewhat as at 24 from the plane of the main body portion 10 of the device.

The frame 20 bends outwardly at 26 forming a lip 28 for slipping papers into a space between the elements 20 and 22. Such papers may be a small pad, notes, cardboard or the like which will be passed with a spring grip, the material of the device being of a plastic or somewhat springy nature.

From the head 12 the arms 14 and 16 extend in opposite directions and terminate in elements 30,32 which can be easily cut off or bent along lines 34 should this become necessary in order to insert the same in certain kinds of telephones, e.g. those having push buttons thereon in addition to the usual finger tip openings or touch-tone buttons.

Figure 3:
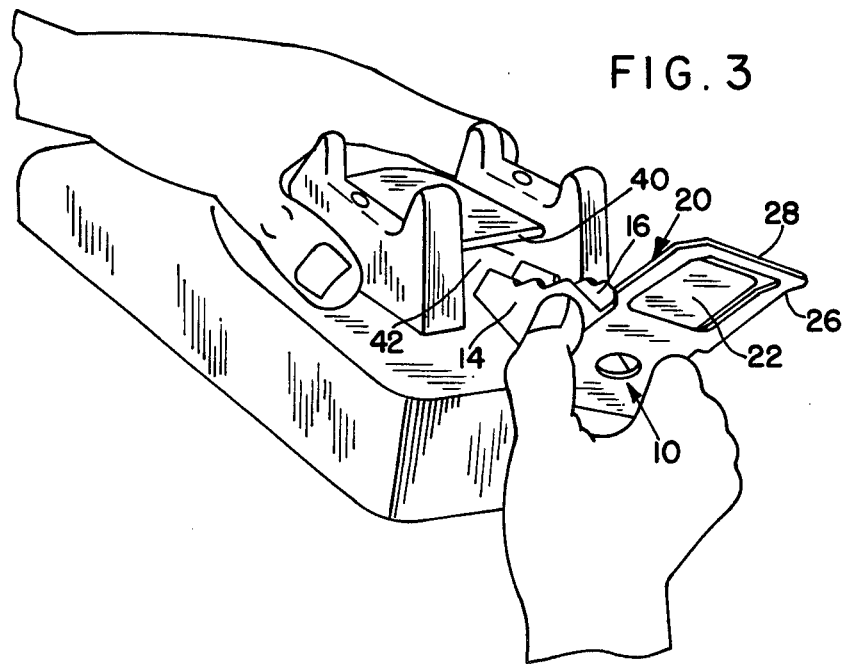
FIG. 3 is a respective view illustrating the device adapted to be snapped into the lift slot of the telephone.

The upper edges of the arms 14,16 are provided with spaced notches 36,38 which align themselves, see FIG. 3, when the arms are folded into parallel position as shown therein, ready for insertion behind the lip 40 of the lift slot 42 of the telephone, the desk type. The arms have a width equal to the vertical dimensions or height of the lift slot. The arms are folded as shown in FIG. 3 on hinge lines 44 and merely snapped under the lip 40 which snaps into either aligned notches 36,36 or 38,38 depending in some degree upon the manufacturer and style of phone involved. In order to facilitate bending the arms, crease lines or depressions 42 are provided between the head 12 and the arms.

The device is very easy and inexpensive to manufacture and package, and personal identification or advertising, as well as phone numbers can be printed on the face of the head.

I claim:

1. An attachment for a desk type telephone having a lift slot at the rear thereof, and a lip at the upper edge of the lift slot,
   said attachment comprising a substantially flat sheet of molded plastic material including a central generally flat head,
   said sheet including a pair of foldable flat arms, said arms extending oppositely from creased hinge lines between the arms and the flat head,
   a notch in each arm at its upper edge,
   said notches being aligned when the arms are folded on said hinge lines into general parallelism and said arms including means for snap-locking into place when inserted under the lip in the lift slot to detachably hold the attachment with the arms at least partially in the lift slot.

2. The attachment of claim 1 including a pair of springy members extending up from the head to hold an object between the members.

3. The attachment of claim 2 wherein the springy members are offset from each other.

4. The attachment of claim 1 including a second notch in each arm.

5. The attachment of claim 1 wherein said crease lines are depressions.

6. The attachment of claim 1 including a terminal portion on each arm adapted to be removed to fit certain telephones.

* * * * *